United States Patent
He et al.

(10) Patent No.: US 10,848,505 B2
(45) Date of Patent: Nov. 24, 2020

(54) CYBERATTACK BEHAVIOR DETECTION METHOD AND APPARATUS

(71) Applicant: TENCENT TECHNOLOGY (SHENZHEN) COMPANY LIMITED, Guangdong (CN)

(72) Inventors: Yan Jun He, Shenzhen (CN); Fu Cheng Long, Shenzhen (CN); Li Qian Cui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 47 days.

(21) Appl. No.: 16/026,793

(22) Filed: Jul. 3, 2018

(65) Prior Publication Data

US 2018/0332057 A1    Nov. 15, 2018

Related U.S. Application Data

(63) Continuation of application No. PCT/CN2017/093156, filed on Jul. 17, 2017.

(30) Foreign Application Priority Data

Jul. 19, 2016    (CN) .......................... 2016 1 0575103

(51) Int. Cl.
*H04L 29/06* (2006.01)
*G06F 21/57* (2013.01)
(Continued)

(52) U.S. Cl.
CPC ........ *H04L 63/1416* (2013.01); *G06F 21/554* (2013.01); *G06F 21/563* (2013.01); *G06F 21/577* (2013.01); *H04L 63/101* (2013.01); *H04L 63/102* (2013.01); *H04L 63/1466* (2013.01); *H04L 67/16* (2013.01)

(58) Field of Classification Search
CPC ............... H04L 63/1416; H04L 63/102; H04L 63/1466; H04L 63/101; H04L 67/16; G06F 21/554; G06F 21/563; G06F 21/577
See application file for complete search history.

(56) References Cited

U.S. PATENT DOCUMENTS

| 9,398,028 | B1* | 7/2016 | Karandikar ......... H04L 63/1408 |
| 9,930,012 | B1* | 3/2018 | Clemons, Jr. ....... H04L 12/4625 |

(Continued)

FOREIGN PATENT DOCUMENTS

| CN | 102082810 A | 6/2011 |
| CN | 103248472 A | 8/2013 |

(Continued)

OTHER PUBLICATIONS

International Search Report for PCT/CN2017/093156, dated Oct. 18, 2017.

*Primary Examiner* — Abu S Sholeman
(74) *Attorney, Agent, or Firm* — Sughrue Mion, PLLC

(57) ABSTRACT

A cyberattack behavior detection method and related apparatus are provided. The method includes receiving user upload information in a multilayer architecture, and detecting whether a cyberattack is included in the upload information. The upload information is only transmitted to a business logic layer for processing the upload information in response to the cyberattack not being detected.

20 Claims, 15 Drawing Sheets

(51) Int. Cl.
*G06F 21/56* (2013.01)
*G06F 21/55* (2013.01)
*H04L 29/08* (2006.01)

(56) References Cited

U.S. PATENT DOCUMENTS

| | | | |
|---|---|---|---|
| 2005/0108272 A1* | 5/2005 | Behrens | G06F 9/546 |
| 2010/0083240 A1* | 4/2010 | Siman | G06F 8/433 |
| | | | 717/144 |
| 2013/0152189 A1 | 6/2013 | Lee et al. | |
| 2015/0067764 A1* | 3/2015 | Kim | H04L 63/101 |
| | | | 726/1 |
| 2015/0372953 A1* | 12/2015 | Davis | H04L 51/12 |
| | | | 455/412.2 |
| 2016/0301680 A1* | 10/2016 | Main | G06Q 30/0267 |
| 2016/0306986 A1* | 10/2016 | Zhang | H04L 63/102 |
| 2018/0054438 A1* | 2/2018 | Li | H04L 63/0236 |

FOREIGN PATENT DOCUMENTS

| | | | |
|---|---|---|---|
| CN | 105704146 A | 6/2016 | |
| CN | 105959335 A | 9/2016 | |

* cited by examiner

CYBERATTACK BEHAVIOR DETECTION METHOD AND APPARATUS

CROSS-REFERENCE TO RELATED APPLICATIONS

This application is a continuation of International Application No. PCT/CN2017/093156 filed on Jul. 17, 2017, which claims priority from Chinese Patent Application 201610575103.X, filed with the Chinese Patent Office on Jul. 19, 2016 and entitled "CYBERATTACK BEHAVIOR DETECTION METHOD AND RELATED APPARATUS", the disclosures of each of which are herein incorporated by reference in their entirety.

BACKGROUND

1. Field

This application relates to the field of data processing technologies, and specifically relates to a cyberattack behavior detection method and related apparatus.

2. Description of Related Art

A cyberattack behavior is a network attack behavior performed on hardware, software of a network system and data in a system by using vulnerability and security defects that exist in a network. With development of network technologies, the cyberattack behavior increasingly affects network security. For example, some cyberattack behaviors may commit a piece of database query code to obtain some wanted data, such as information of a user account, or a password, according to a result that a program returns. Some cyberattack behaviors embed malicious code into a webpage provided to other users who use or execute the malicious code in order to steal a variety of user accounts or to control various enterprise data.

Therefore, how to provide a cyberattack behavior detection method to improve network data security becomes a problem to be urgently resolved currently.

SUMMARY

It is an aspect to provide a cyberattack behavior detection method and related apparatus to implement timely detection of a cyberattack behavior, so as to improve network data security.

According to an aspect of one or more exemplary embodiments, there is provided a method. The method includes receiving user upload information in a multilayer architecture, and detecting whether a cyberattack is included in the upload information. The upload information is only transmitted to a business logic layer for processing the upload information in response to the cyberattack not being detected.

According to other aspects of one or more exemplary embodiments, there is provided an apparatus consistent with the method.

BRIEF DESCRIPTION OF THE DRAWINGS

Various exemplary embodiments are described below with reference to the accompanying drawings, in which.

DETAILED DESCRIPTION

The following clearly and completely describes the technical solutions in the exemplary embodiments of this application with reference to the accompanying drawings in which various exemplary embodiments of this application are shown. The described exemplary embodiments are some exemplary embodiments of this application rather than all of the exemplary embodiments. All other exemplary embodiments obtained by a person of ordinary skill in the art based on the exemplary embodiments of this application without creative efforts shall fall within the protection scope of this application and the appended claims.

The inventor of the solutions herein found that a cyberattack behavior increasingly affects network security with development of network technologies. For example, some cyberattack behaviors may commit a piece of database query code to obtain some wanted data, such as information of a user account, or a password, according to a result that a program returns. Other cyberattack behaviors embed malicious code into a webpage provided for one or more users who then use and execute this malicious code. A variety of user accounts are stolen or enterprise data is controlled by embedding the malicious code.

Therefore, how to provide a cyberattack behavior detection method to improve network data security becomes a problem to be urgently resolved currently.

Exemplary embodiments provide a cyberattack behavior detection method and related apparatus that solve the foregoing problem by using the technical solutions, including: receiving user upload information and determining whether the user upload information includes cyberattack information; and sending the user upload information to a business logic layer for processing only if the user upload information does not include the cyberattack information. A detection process performed on the user upload information provided in the exemplary embodiments of this application may find whether the user upload information includes the cyberattack information in sufficient time to prevent the malicious effects of the cyberattack information, and the user upload information is sent to the business logic layer for processing if the user upload information does not include the cyberattack information, thereby implementing timely detection of a cyberattack behavior and improving network data security; the user upload information is not sent to the business logic layer for processing if the user upload information includes the cyberattack information, thereby avoiding a step of performing a process on the cyberattack information on the business logic layer, reducing resource consumption of a server and relieving stress on the server.

Figure 1:
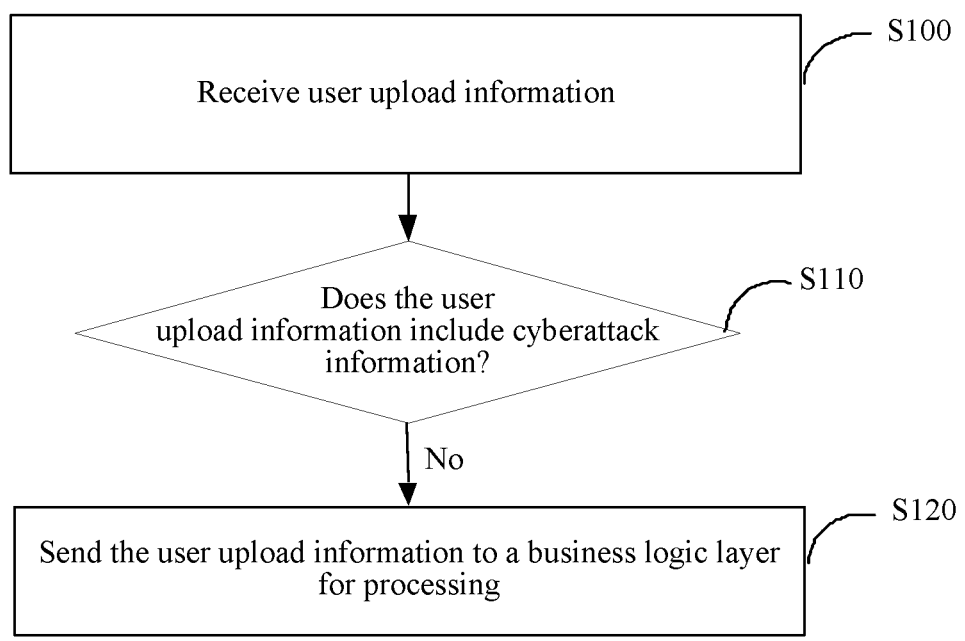
FIG. 1 is a flowchart of a cyberattack behavior detection method according to an exemplary embodiment.

FIG. 1 is a flowchart of a cyberattack behavior detection method according to an exemplary embodiment. The method may be applied to a server that may provide cyberattack behavior detection. The server may specifically be a cluster server, and the server has a function to communicate with a client through a network. Referring to FIG. 1, the method may include:

Step S100: Receive user upload information.

In some exemplary embodiments, the user upload information may be information uploaded actively in an interaction process between a client and a server or information uploaded by the client in response to a server request.

Step S110: Determine whether the user upload information includes cyberattack information.

In some exemplary embodiments, steps of determining whether the user upload information includes cyberattack information may determine whether sender information in the user upload information includes authorized sender information, or may determine whether an upload request parameter in the user upload information includes cyberattack information. This is described in more detail below.

Step S120: Send the user upload information to a business logic layer for processing only if the user upload information does not include the cyberattack information.

In some exemplary embodiments, a frame layer is a reusable design framework of an entire system. The business logic layer, which may also be referred to as a domain layer, mainly focuses on a process of a service in a system field, and is responsible for generation, processing and transformation of logical data. Generally, a request is firstly processed on the frame layer and then transferred to the business logic layer for processing. Therefore, the frame layer encapsulates a public method for performing a process on all requests, and therefore is generally highly abstracted, while the business logic layer is for field service processing and is more specific.

The cyberattack behavior detection method disclosed in this exemplary embodiment of this application is mainly performed on the frame layer. The user upload information is sent to the business logic layer for processing only if the user upload information does not include the cyberattack information on the frame layer, thereby implementing timely detection of a cyberattack behavior and improving network data security. The user upload information is not sent to the business logic layer for processing if the user upload information includes the cyberattack information, thereby avoiding a step of performing a process on the cyberattack information on the business logic layer and generation of junk data in excess, so that resource consumption of a server may be reduced and stress on the server may be relieved.

Figure 2:
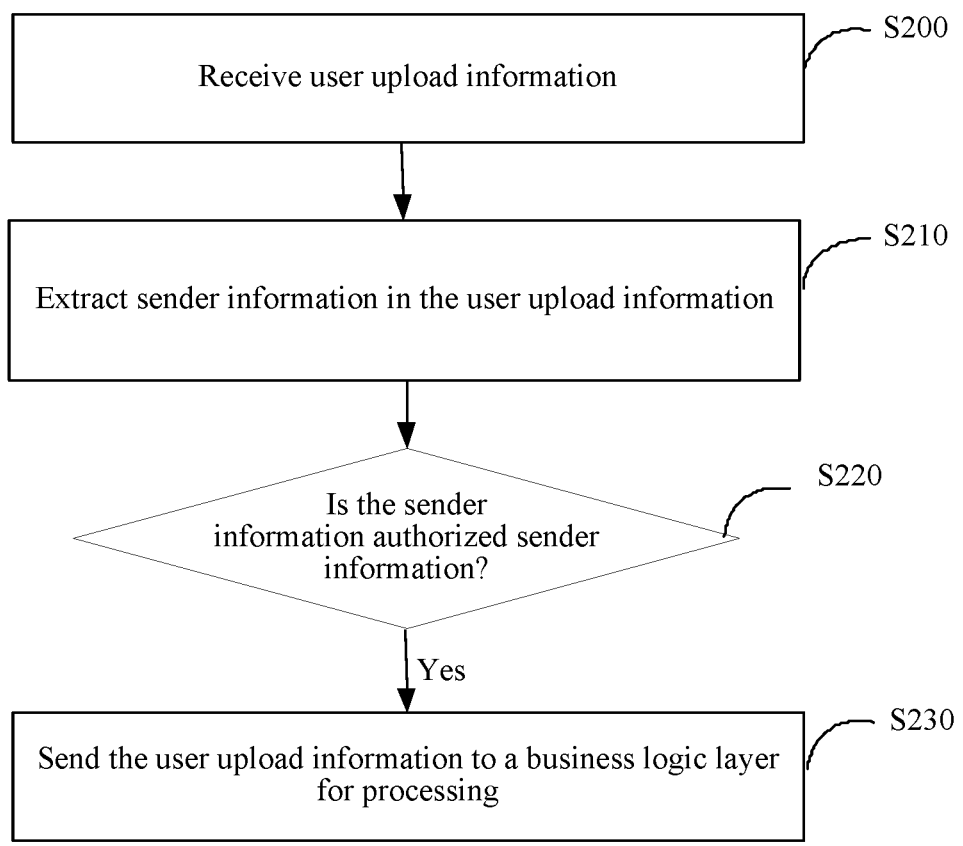
FIG. 2 is another flowchart of a cyberattack behavior detection method according to an exemplary embodiment.

A flowchart of another cyberattack behavior detection method provided according to an exemplary embodiment is shown in FIG. 2. Referring to FIG. 2, the method may include:

Step S200: Receive user upload information.

Step S210: Extract sender information in the user upload information.

In some exemplary embodiments, the sender information at least includes: a user identifier (such as an account used by a user for logging in to an application) corresponding to a user that sent the user upload information, or a protocol IP address interconnected between networks of users that sent the user upload information.

Step S220: Determine whether the sender information is authorized sender information.

In some exemplary embodiments, a sender whitelist may be maintained on a server end in this exemplary embodiment of this application, the sender whitelist at least including: authorized sender information corresponding to an authorized user that sent the user upload information. The sender whitelist is stored on the server, and the authorized sender information corresponding to the authorized user in the sender whitelist may be regularly updated by a staff member. This exemplary embodiment of this application is not specifically limited.

Based on this, steps of determining whether the sender information is authorized sender information disclosed in this exemplary embodiment of this application may include: determining whether the sender information is stored in the sender whitelist, and if yes, it is determined that the sender information is the authorized sender information and considered that the user upload information does not include cyberattack information; and if no, it is determined that the sender information is unauthorized sender information and considered that the user upload information includes the cyberattack information.

In some exemplary embodiments, a sender blacklist may be maintained on a server end in this exemplary embodiment of this application, the sender blacklist at least including: unauthorized sender information corresponding to an unauthorized user that sent the user upload information. The sender blacklist is stored on the server and the unauthorized sender information corresponding to the unauthorized user in the sender blacklist may be regularly updated by a staff member. The sender information corresponding to a user that sent the user upload information may be verified to automatically update the unauthorized sender information corresponding to the unauthorized user in the sender blacklist. This exemplary embodiment of this application is not specifically limited.

Based on this, steps of determining whether the sender information is authorized sender information disclosed in this exemplary embodiment of this application may include: determining whether the sender information is not stored in the sender blacklist, and if the sender information is not stored in the sender blacklist, it is determined that the sender information is the authorized sender information and considered that the user upload information does not include cyberattack information; if the sender information is stored in the sender blacklist, it is determined that the sender information is the unauthorized sender information and considered that the user upload information includes the cyberattack information.

In some exemplary embodiments, if it is determined that the user upload information does not include the cyberattack information in this exemplary embodiment of this application, this exemplary embodiment may further include: extracting the sender information in the user upload information that does not include the cyberattack information; and updating the sender whitelist according to the sender information in the user upload information that does not include the cyberattack information.

Alternatively, in some exemplary embodiments, extract the sender information in the user upload information that includes the cyberattack information; and update the sender blacklist according to the sender information in the user upload information that includes the cyberattack information.

Step S230: Send the user upload information to a business logic layer for processing if the sender information is the authorized sender information, that is, if the user upload information does not include a cyberattack.

A detection process performed on the user upload information according to the cyberattack behavior detection method provided in this exemplary embodiment of this application may find in time that the sender information is the authorized sender information, and the user upload information is sent to the business logic layer for processing if the sender information is the authorized sender information, thereby implementing timely detection of a cyberattack behavior and improving network data security. The user upload information is not sent to the business logic layer for processing if the sender information is unauthorized sender information, thereby avoiding a step of performing a process on the cyberattack information on the business logic layer, reducing resource consumption of a server and relieving stress on the server.

Figure 3:
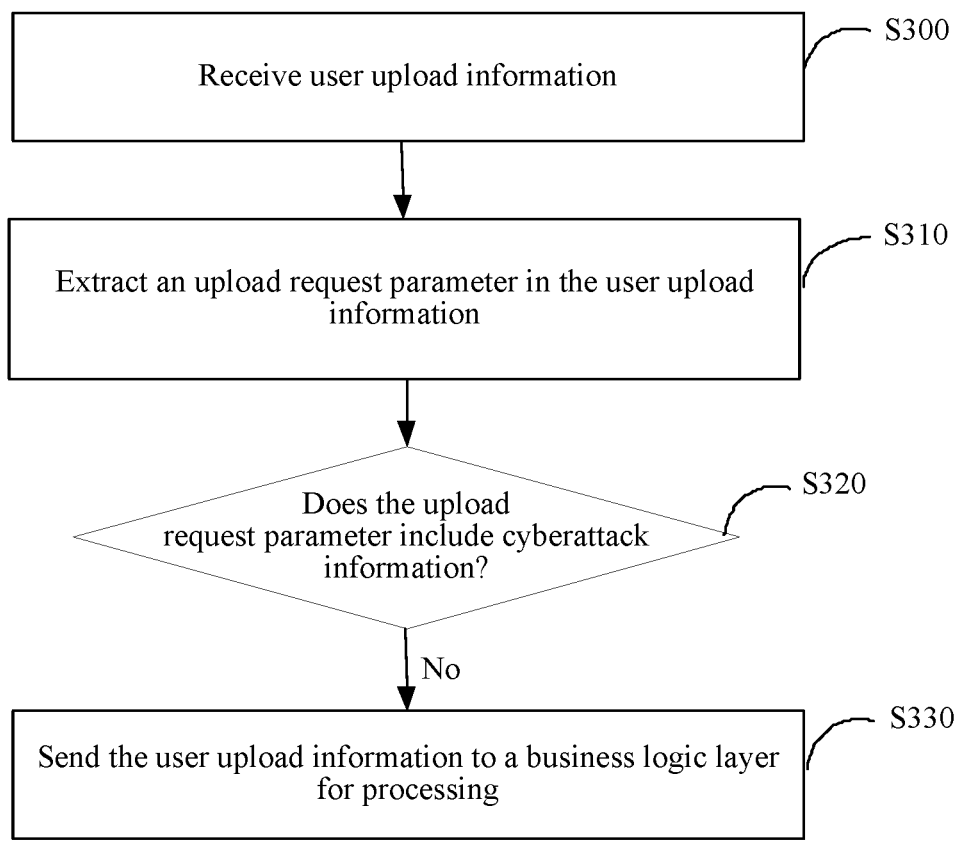
FIG. 3 is still another flowchart of a cyberattack behavior detection method according to an exemplary embodiment.

A flowchart of another cyberattack behavior detection method according to an exemplary embodiment is shown in FIG. 3. Referring to FIG. 3, the method may include:

Step S300: Receive user upload information.

Step S310: Extract an upload request parameter in the user upload information.

In some exemplary embodiments, the upload request parameter may be a parameter used by a user in an upload information process, such as a login request parameter committed in a process that a client logs in to an application, or a query request parameter sent by the client actively to a server, or an interaction statement parameter transmitted in an interaction process between the client and the server. This exemplary embodiment of this application is not specifically limited.

Step S320: Determine whether the upload request parameter includes cyberattack information.

It should be noted that, attack manners that commonly seen on a network currently are: SQL (Structured Query Language, Structured Query Language) injection attack and XSS (Cross Site Scripting, Cross Site Scripting) injection attack. SQL injection attack means a user may commit a piece of database query code to obtain some wanted data according to a result that a program returns. XSS injection attack is usually computer security vulnerability presented on a web application, and the XSS injection attack allows a malicious webpage user to embed malicious code into a webpage provided for other users for using, to achieve a purpose of stealing a variety of user accounts or controlling enterprise data. XSS injection attack includes stored attack and reflected attack. Stored attack is that affection is only generated when attack code is used by other users after the attack code is stored, while reflected attack only affects a current access.

For the foregoing two types of attack behaviors, the following is used as an example for illustration:

It is assumed that an SQL statement in a program is SELECT*FROM Users WHERE Username='$username' AND Password='$password', and if content of upload information inputted by a user is $username=1'or'1'='1 and $password=1'or'1'='1, SELECT*FROM Users WHERE Username='1' OR '1'='1' AND Password='1' OR '1'='1' is obtained when detection is not performed on a cyberattack behavior. Information of all users is queried through this SQL statement, to leak data of the users.

If a user constructs specific content that has an XSS attack behavior in a request parameter and the data is stored in a database by a program, other users leak their information such as login states without being informed when accessing the data. For example, if upload information of a piece of code <script>alert (document.cookie)</script> is inputted by the user and may come into effect, a script may be constructed, to send data information stored on a user local terminal by a current access user to a specified server, so as to steal login information of the current access user and hijack a session of the current access user.

It should be noted that, an SQL injection attack mainly uses the following manners to generate an attack behavior: constructing a special statement in a parameter, obfuscating a data class and accessing data beyond authority. An XSS injection attack mainly uses the following manners to generate an attack behavior: adding a space character, or a carriage return character, and codes html (hyper text markup language, hyper text markup language) attribute by Ascii (American Standard Code for Information Interchange, American Standard Code for Information Interchange) and performs mixed-case.

With reference to the foregoing attack manners and attack features of the SQL injection attack and the XSS injection attack, a specific process for determining whether the upload request parameter includes the cyberattack information disclosed in this exemplary embodiment of this application may use at least one of the following two manners:

In a first manner, whether the upload request parameter includes a structured query language SQL injection attack feature character is determined. For example, whether the upload request parameter includes a database special character, such as a backquote, or a single quotation mark is determined. This exemplary embodiment of this application is not specifically limited.

In a second manner, whether the upload request parameter includes a cross site scripting XSS injection attack feature character is determined. For example, whether the upload request parameter includes a special character, such as a <, a>, a', a &, or a # is determined. This exemplary embodiment of this application is not specifically limited.

Step S330: Send the user upload information to a business logic layer for processing only if the upload request parameter does not include the cyberattack information.

A detection process performed on the user upload information according to the cyberattack behavior detection method provided in this exemplary embodiment of this application may find whether the upload request parameter includes the cyberattack information in sufficient time to prevent the malicious effects of the cyberattack information, and the user upload information is sent to the business logic layer for processing if the upload request parameter does not include the cyberattack information, thereby implementing timely detection of a cyberattack behavior and improving network data security; the user upload information is not sent to the business logic layer for processing if the upload request parameter includes the cyberattack information, thereby avoiding a step of performing a process on the cyberattack information on the business logic layer, reducing resource consumption of a server and relieving stress on the server.

Figure 4:
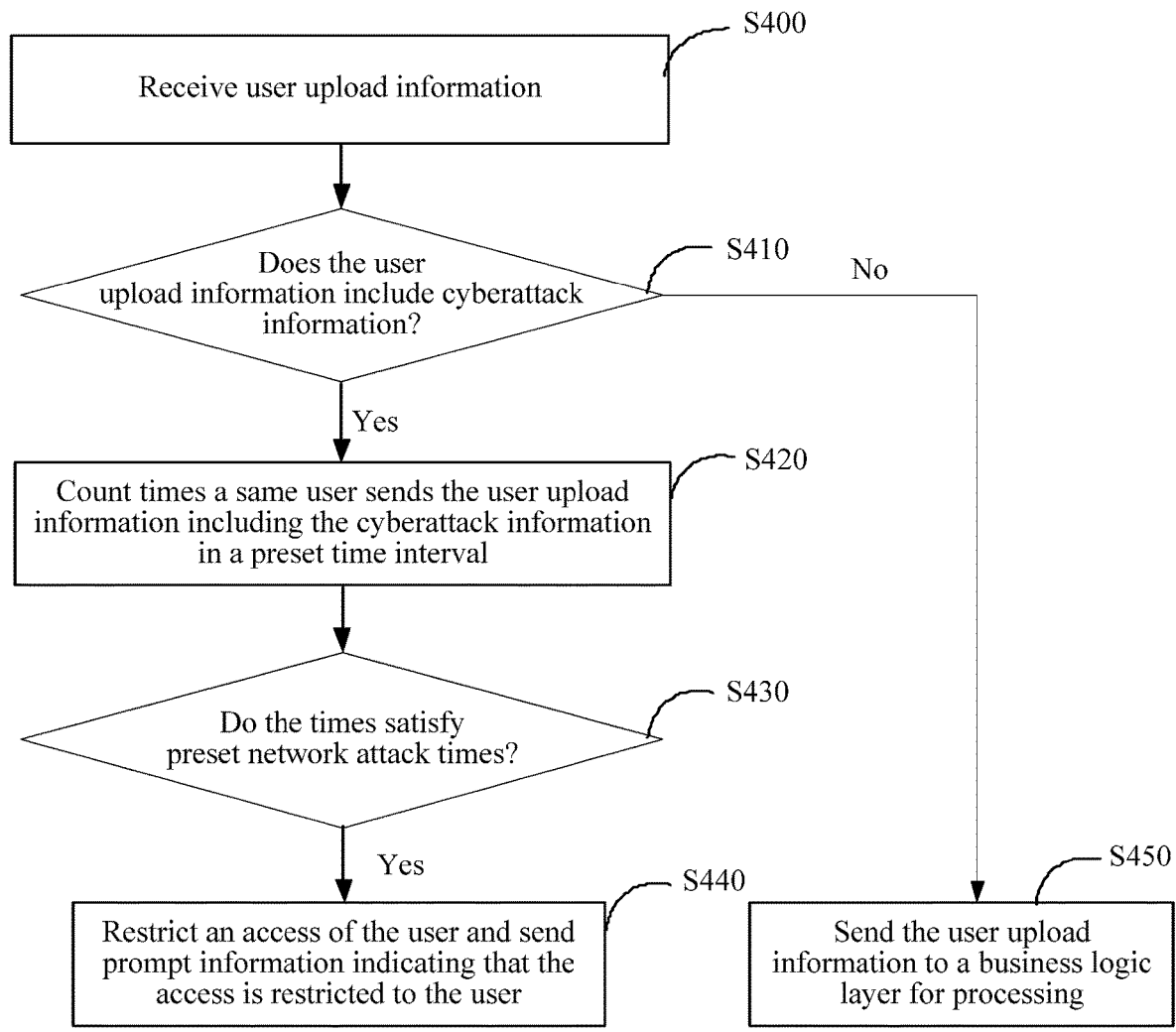
FIG. 4 is still another flowchart of a cyberattack behavior detection method according to an exemplary embodiment.

A flowchart of another cyberattack behavior detection method according to an exemplary embodiment is shown in FIG. 4. Referring to FIG. 4, the method may include:

Step S400: Receive user upload information.

Step S410: Determine whether the user upload information includes cyberattack information; perform step S420 if the user upload information includes the cyberattack information; and perform step S450 if the user upload information does not include the cyberattack information.

Step S420: Count a number of times a same user sends the user upload information including the cyberattack information in a preset time interval.

Step S430: Determine whether the number of times the same user sends the user upload information including the cyberattack information satisfies a preset network attack times threshold, and perform step S440 if the number of times the same user sends the user upload information including the cyberattack information satisfies the preset network attack times threshold. That is, whether the number of time is greater than the threshold is determined.

It should be noted that, the preset network attack times threshold may be set by a server based on a counted frequency of generating a cyberattack behavior, or set based on experience. This exemplary embodiment of this application is not specifically limited.

Step S440: Restrict an access of the user and send prompt information indicating that the access is restricted to the user.

In this exemplary embodiment of this application, for a case that a user is added to a blacklist and an access sent by the user is restricted to affect a normal operation of the user when some information uploaded by the user is mistaken for cyberattack information, it is considered that a cyberattack behavior of a hacker is generally a high frequent case, that is, user upload information is sent continuously when a hacker performs a network attack. Based on this, operations of the number of times a same user sent the user upload information including the cyberattack information in a preset time interval is counted in this exemplary embodiment of this application. In other words, whether an operation that a user uploads information is a cyberattack behavior is determined by detecting frequency that the cyberattack behavior is initialized.

Figure 5:
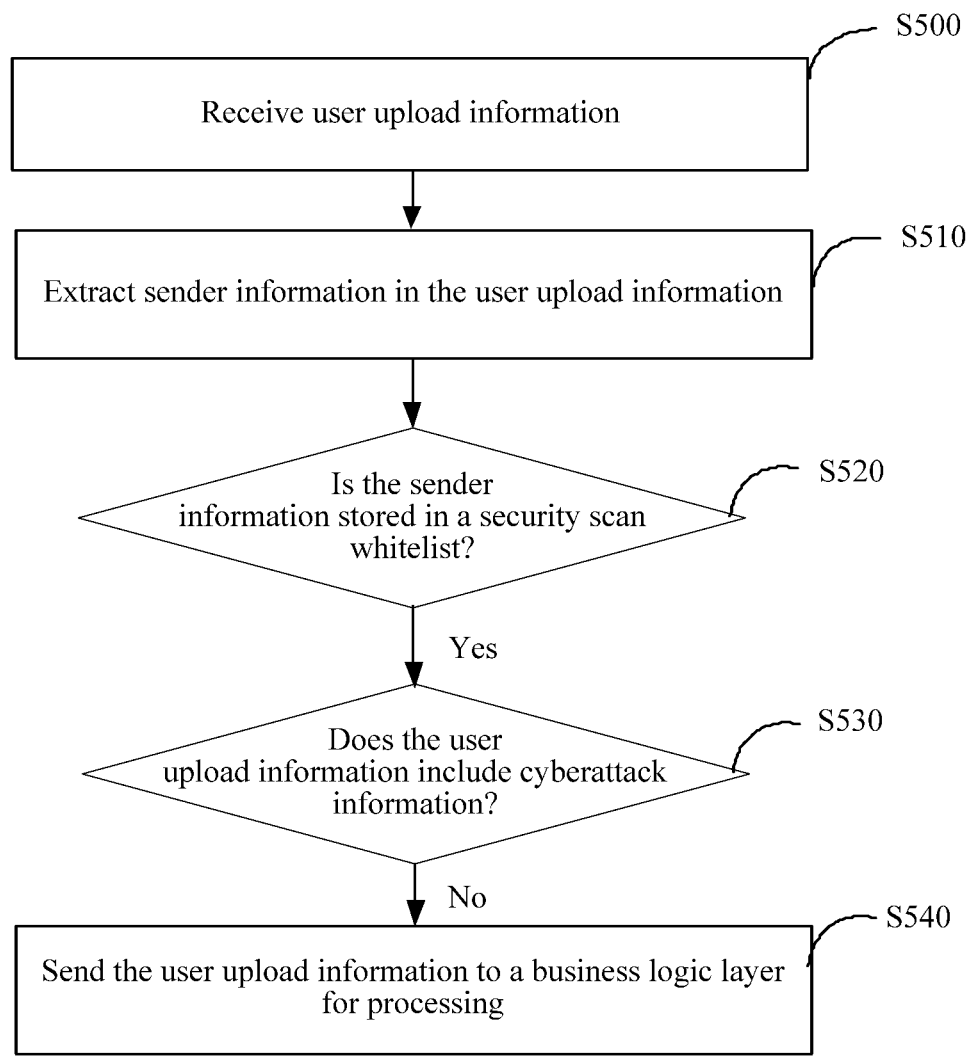
FIG. 5 is still another flowchart of a cyberattack behavior detection method according to an exemplary embodiment.

A flowchart of another cyberattack behavior detection method according to an exemplary embodiment is shown in FIG. 5. Referring to FIG. 5, the method may include:

Step S500: Receive user upload information.

Step S510: Extract sender information in the user upload information.

Step S520: Determine whether the sender information is stored in a security scan whitelist, and if yes, perform step S530.

It should be noted that, the security scan whitelist at least includes: sender information adapted to a security platform vulnerability scan.

Step S530: Determine whether the user upload information includes cyberattack information; and perform step S540 only if the user upload information does not include the cyberattack information.

Step S540: Send the user upload information to a business logic layer for processing.

It should be noted that, cyberattack information is also included in upload information sent by an internal personnel when the internal personnel performs vulnerability scan on an application or a security platform of a website regularly, but in this case the cyberattack information is not a malicious cyberattack behavior by an external personnel in this case. Rather, the cyberattack information is a security maintenance process by the internal personnel on the application or the website. A security scan whitelist is prestored on a server in this exemplary embodiment of this application, and a step for determining whether sender information in the user upload information is sender information adapted to security platform vulnerability scan is performed, so that it may be prevented that vulnerability scan performed by the internal personnel on a security platform is mistaken for a cyberattack behavior.

Figure 6:
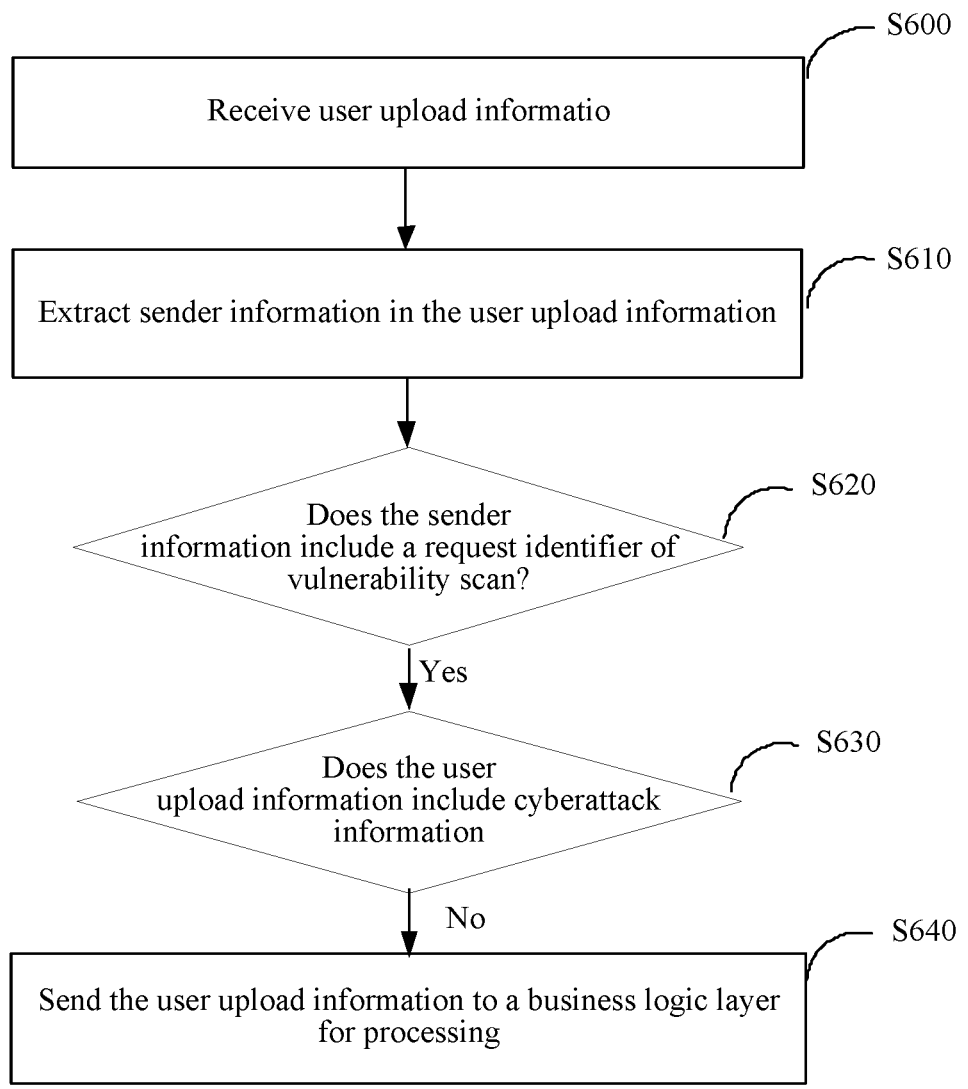
FIG. 6 is still another flowchart of a cyberattack behavior detection method according to an exemplary embodiment.

A flowchart of another cyberattack behavior detection method according to an exemplary embodiment is shown in FIG. 6. Referring to FIG. 6, the method may include:

Step S600: Receive user upload information.

Step S610: Extract sender information in the user upload information.

Step S620: Determine whether the sender information includes a request identifier of vulnerability scan, and if yes, perform step S630.

It should be noted that, the request identifier of the vulnerability scan indicates that a behavior of sending the user upload information is a behavior of performing vulnerability scan on an application or a security platform of a website, and the request identifier of the vulnerability scan is added to the sender information in advance before a staff member performs vulnerability scan.

Step S630: Determine whether the user upload information includes cyberattack information; and perform step S640 only if the user upload information does not include the cyberattack information.

Step S640: Send the user upload information to a business logic layer for processing.

A step for determining whether the sender information includes the request identifier of the vulnerability scan is performed in this exemplary embodiment of this application, so that it may be prevented that vulnerability scan performed by an internal personnel on a security platform is mistaken for a cyberattack behavior.

The following introduces a cyberattack behavior detection apparatus according to various exemplary embodiments. The cyberattack behavior detection apparatus described below and the foregoing cyberattack behavior detection method may correspond to each other and thus reference is made to the above methods.

Figure 7:
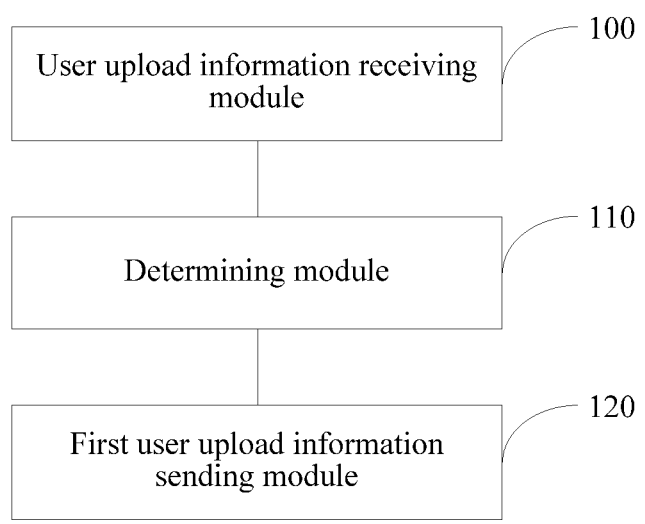
FIG. 7 is a structural block diagram of a cyberattack behavior detection apparatus according to an exemplary embodiment.

FIG. 7 is a structural block diagram of a cyberattack behavior detection apparatus according to an exemplary embodiment, and the cyberattack behavior detection apparatus may specifically be an application server. Referring to FIG. 7, the cyberattack behavior detection apparatus may include:

a user upload information receiving module 100, configured to receive user upload information, the user upload information being information uploaded actively in an interaction process between a client and a server or information uploaded by the client in response to a server request;

a determining module 110, configured to determine whether the user upload information includes cyberattack information; and a first user upload information sending module 120, configured to send the user upload information to a business logic layer for processing if the user upload information does not include the cyberattack information.

Figure 8A:
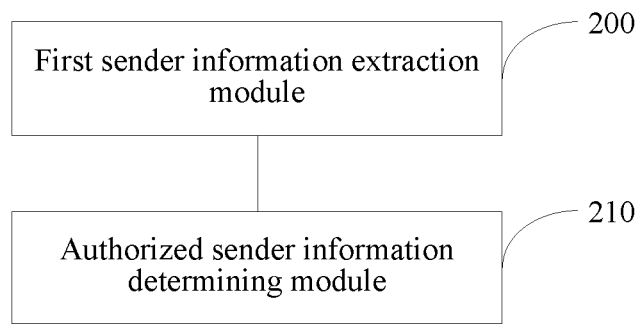
FIGS. 8A-8C are structural block diagrams of a determining module of the cyberattack behavior detection apparatus of FIG. 7, according to various exemplary embodiments.

In some exemplary embodiments, a structural diagram of the determining module 110 is shown in FIG. 8A. Referring to FIG. 8A, the determining module 110 specifically may include:

a first sender information extraction module 200, configured to extract sender information in the user upload information, wherein the sender information at least includes: a user identifier corresponding to a user that sent the user upload information or a protocol IP address interconnected between networks of users that sent user upload information; and an authorized sender information determining module 210, configured to determine whether the sender information is authorized sender information, and it is determined that the user upload information does not include the cyberattack information if the sender information is authorized sender information, or if not, it is determined that the user upload information includes the cyberattack information.

Figure 8B:
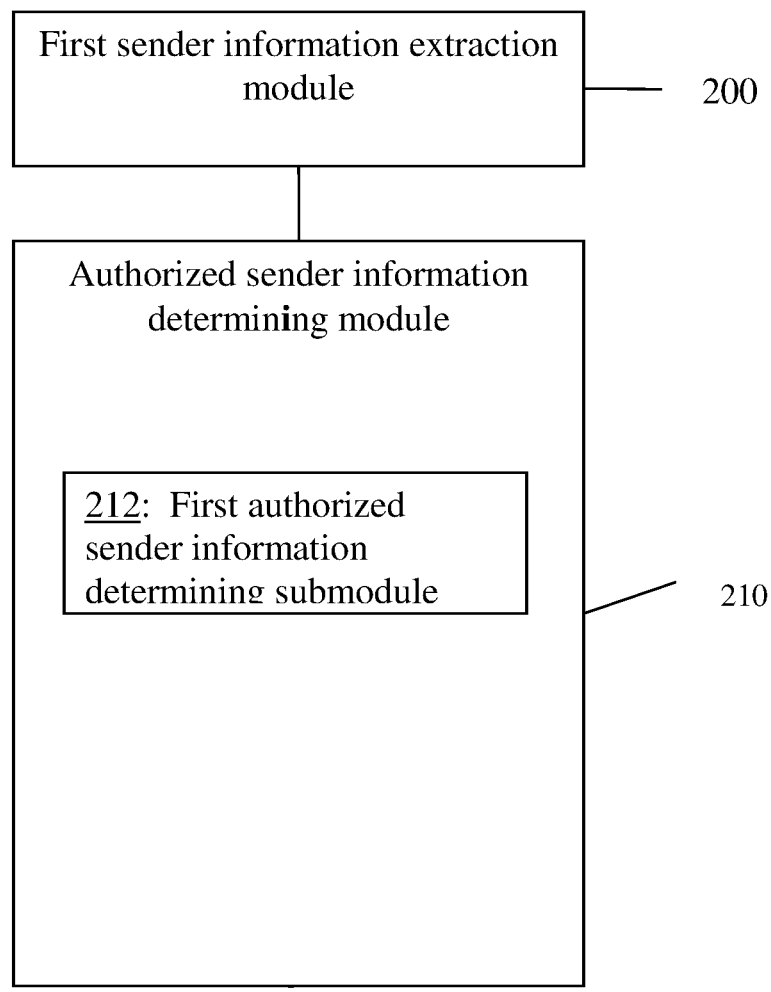
Figure 8C:
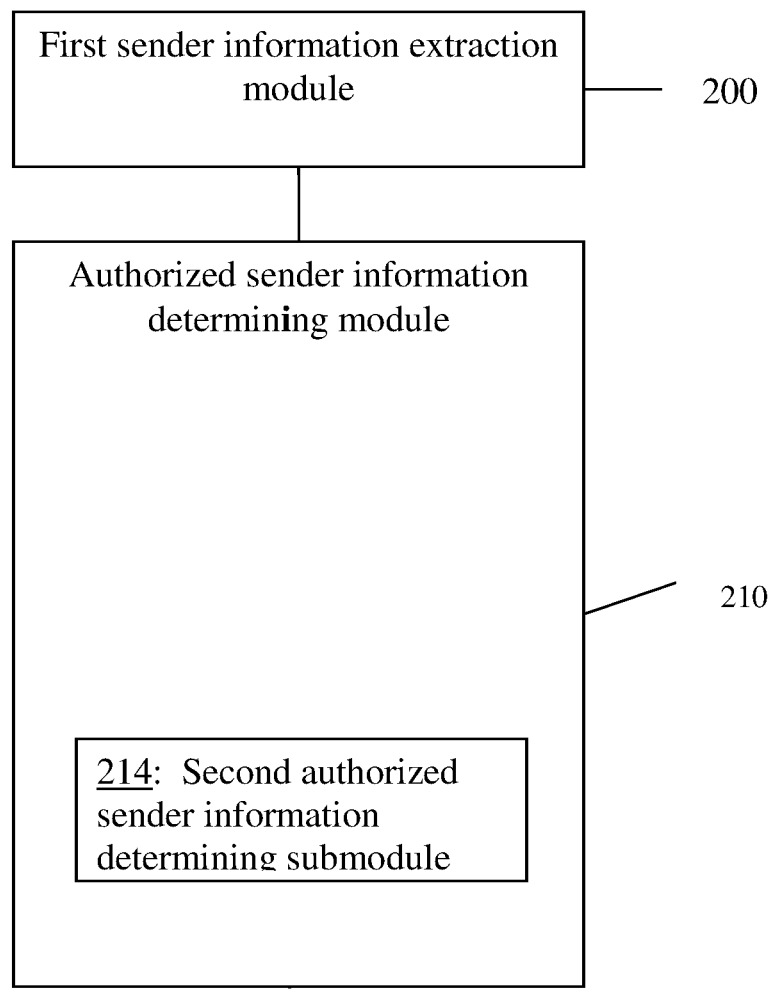

It should be further noted that, an authorized sender information determining module provided in this exemplary embodiment of this application may include a first authorized sender information determining submodule 212 or a second authorized sender information determining submodule 214, as shown in FIGS. 8B and 8C, respectively, where the first authorized sender information determining submodule 212 is configured to determine whether the sender information is stored in a sender whitelist, the sender whitelist at least including: authorized sender information corresponding to an authorized user that sent the user upload information; and the second authorized sender information determining submodule 214 is configured to determine whether the sender information is stored in a sender blacklist, the sender blacklist at least including: unauthorized sender information corresponding to an unauthorized user that sent the user upload information.

Figure 9A:
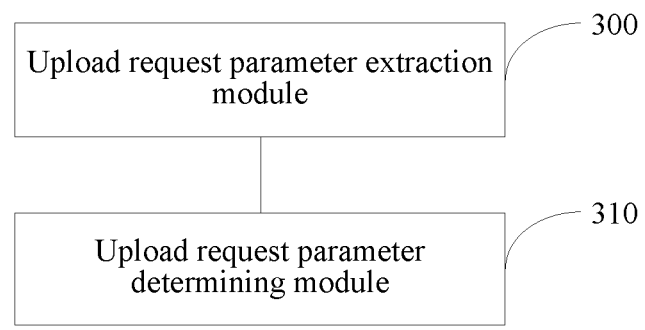
FIGS. 9A-9D are structural block diagrams of a determining module of the cyberattack behavior detection apparatus of FIG. 7, according to various exemplary embodiments.

In some exemplary embodiments, another structural diagram of the determining module 110 is shown in FIG. 9A. Referring to FIG. 9A, the determining module 110 specifically may include:

an upload request parameter extraction module 300, configured to extract an upload request parameter in the user upload information, the upload request parameter being a parameter used by a user in an upload information process; and an upload request parameter determining module 310, configured to determine whether the upload request parameter includes the cyberattack information.

Figure 9B:
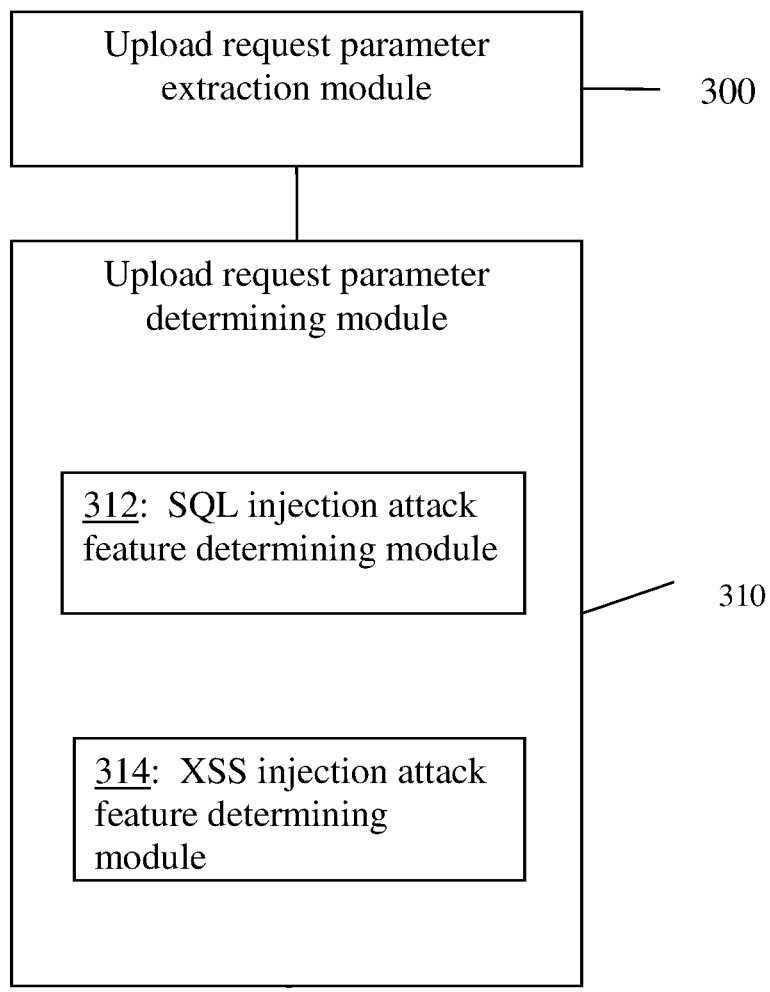
Figure 9C:
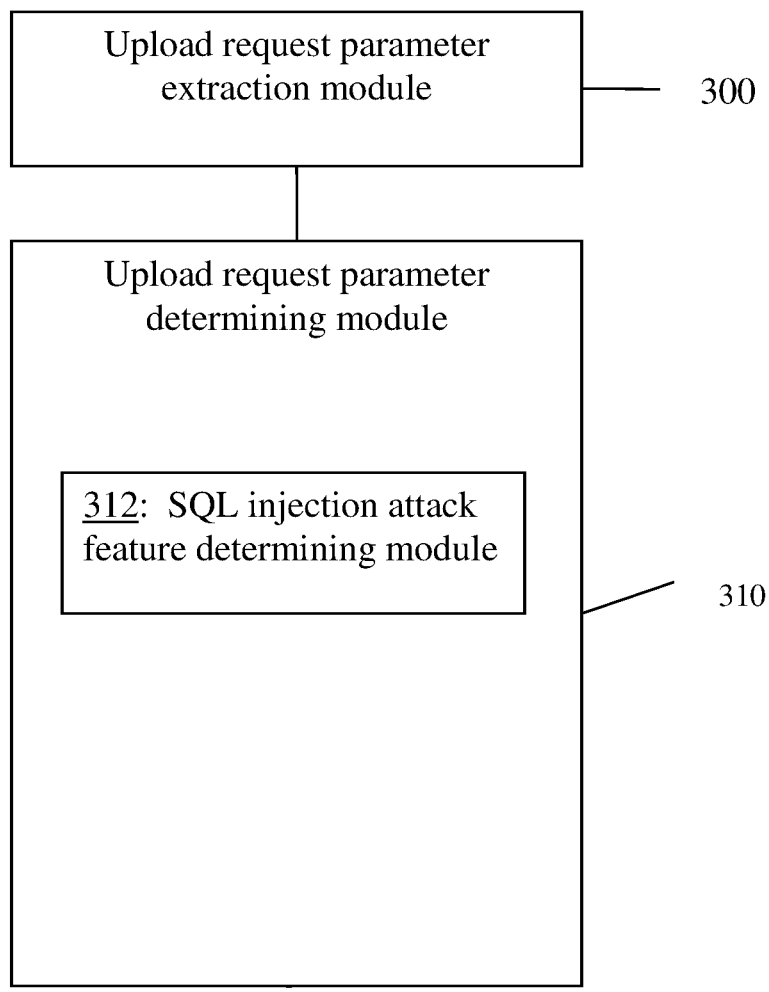
Figure 9D:
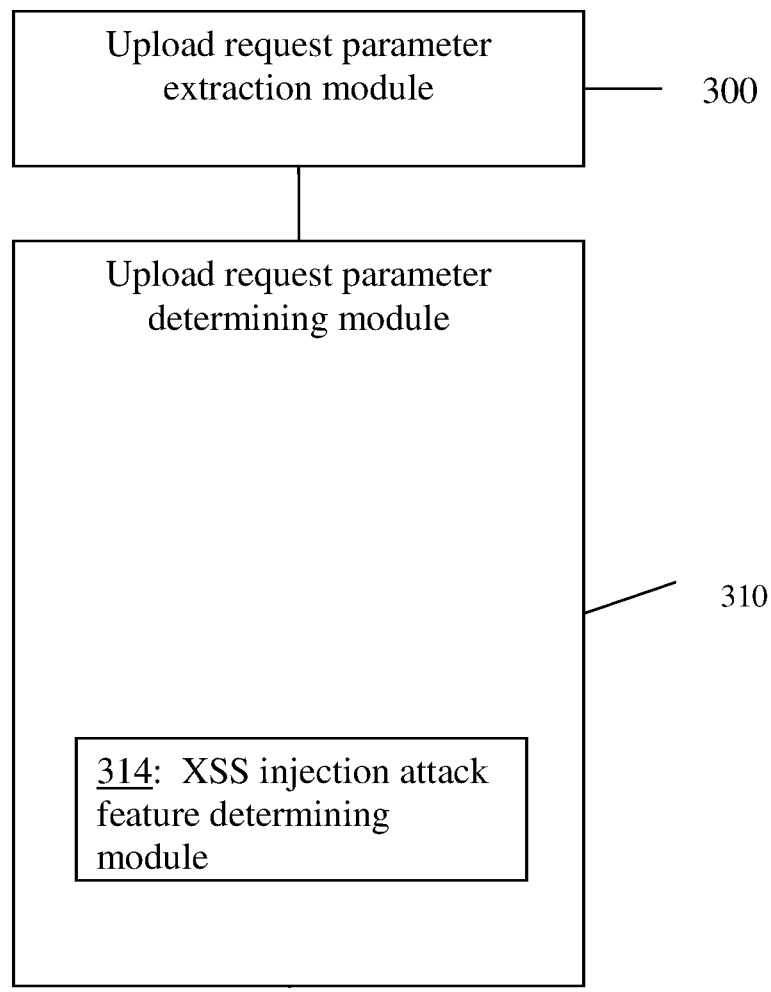

The upload request parameter determining module 310 may include at least one of an SQL injection attack feature determining module 312 and an XSS injection attack feature determining module 314, as shown in FIGS. 9B-9D, where the SQL injection attack feature determining module 312 is configured to determine whether the upload request parameter includes a structured query language SQL injection attack feature character; and the XSS injection attack feature determining module 314 is configured to determine whether the upload request parameter includes a cross cite scripting XSS injection attack feature character.

It should be further noted that the cyberattack behavior detection apparatus provided in this exemplary embodiment of this application may further include: a user upload information times count module, configured to count a number of times a same user sends the user upload information including the cyberattack information in a preset time interval; and a prompt information sending module, configured to send prompt information, if the number of times the same user sends the user upload information including the cyberattack information satisfies preset network attack times threshold, the prompt information indicating that an access is restricted to the user.

It should be further noted that the cyberattack behavior detection apparatus provided in this exemplary embodiment of this application may further include:

a second sender information extraction module, configured to extract the sender information in the user upload information; and a first sender information determining module, configured to determine whether the sender information is stored in a security scan whitelist, the whitelist at least including: sender information adapted to a security platform vulnerability scan.

It should be further noted that the cyberattack behavior detection apparatus provided in this exemplary embodiment of this application may further include:

a third sender information extraction module, configured to extract sender information in the user upload information; and a second sender information determining module, configured to determine whether the sender information includes a request identifier of vulnerability scan.

A cyberattack behavior detection apparatus provided in this exemplary embodiment of this application may further include:

a fourth sender information extraction module, configured to extract the sender information in the user upload information that does not include the cyberattack information; and a whitelist updating module, configured to update the sender whitelist according to the sender information in the user upload information that does not include the cyberattack information.

Moreover, the cyberattack behavior detection apparatus provided in this exemplary embodiment of this application may further include: a fifth sender information extraction module, configured to extract the sender information in the user upload information that includes the cyberattack information; and a blacklist updating module, configured to update the sender blacklist according to the sender information in the user upload information that includes the cyberattack information.

In some exemplary embodiments, the cyberattack behavior detection apparatus may be a hardware device, and the modules, or the units described above may be function modules set in the cyberattack behavior detection apparatus.

Figure 10:
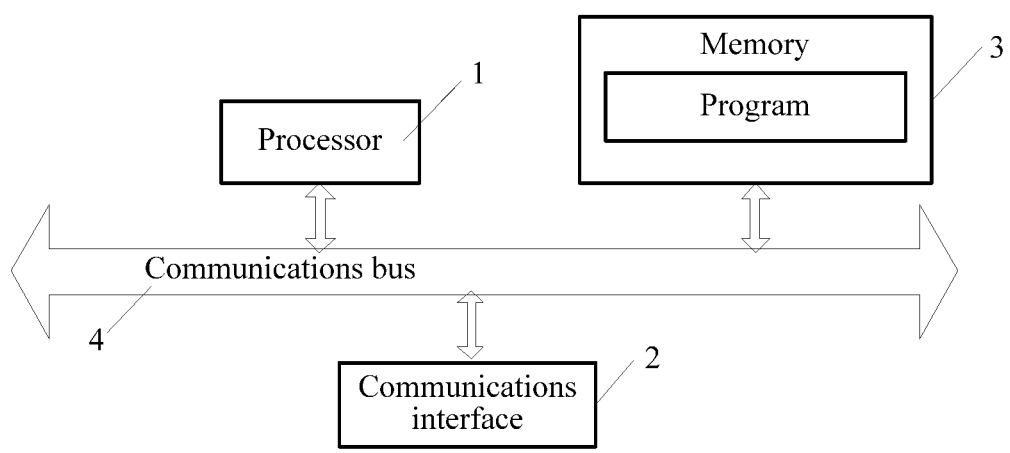
FIG. 10 is a hardware structural block diagram of a cyberattack behavior detection apparatus according to an exemplary embodiment.

A hardware structural block diagram of a cyberattack behavior detection apparatus is shown in FIG. 10. Referring to FIG. 10, the cyberattack behavior detection apparatus may include: a processor 1, a communications interface 2, a memory 3 and a communications bus 4; where the processor 1, the communications interface 2, and the memory 3 communicate with each other through the communications bus 4. In operation, the communications interface 2 may be an interface of a communication module, such as an interface of a GSM module; and the processor 1 may be configured to execute a program; the memory 3 may be configured to store the program; the program may include program code, the program code including computer operating instructions.

The processor 1 may be a central processor unit (CPU), or a specific integrated circuit ASIC (Application Specific Integrated Circuit), or one or more integrated circuits configured to implement the exemplary embodiments of this application; the memory 3 may include a high speed RAM memory, or may further include a non-volatile memory (non-volatile memory), such as at least one magnetic disk storage.

A processor may implement the foregoing cyberattack behavior detection method when executing a program stored in a memory. For example:

receiving user upload information, the user upload information being information uploaded actively in an interaction process between a client and a server or information uploaded by the client in response to a server request;

determining whether the user upload information includes cyberattack information; and sending the user upload information to a business logic layer for processing if the user upload information does not include the cyberattack information.

It should be noted that the exemplary embodiments in this specification are all described in a progressive manner. Description of each of the exemplary embodiments focuses on differences from other exemplary embodiments, and reference may be made to each other for the same or similar parts among respective embodiments. The apparatus exemplary embodiments are substantially similar to the method exemplary embodiments and therefore are only briefly described, and reference may be made to the method exemplary embodiments for the associated part.

Persons skilled in the art may further realize that, in combination with the exemplary embodiments herein, units and algorithm, steps of each example described may be implemented with electronic hardware, computer software, or the combination thereof. In order to clearly describe the interchangeability between the hardware and the software, compositions and steps of each example have been generally described according to functions in the foregoing descriptions. A person skilled in the art may further be aware that, in combination with the examples described in the exemplary embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. A person skilled in the art may use different methods to implement the described functions for each particular application, but it should not be considered that the implementation goes beyond the scope of this application.

In combination with the exemplary embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables persons skilled in the art to implement or use this application. Various modifications to these exemplary embodiments are apparent to persons skilled in the art, and the general principles defined in the present disclosure may be implemented in other embodiments without departing from the spirit and scope of this application and the appended claims. Therefore, this application is not limited to these exemplary embodiments illustrated in the present disclosure, but should be interpreted to provide the broadest scope consistent with the principles and novel features disclosed in the present disclosure.

What is claimed is:

1. A method comprising:
   receiving, from a client through a network by at least one processor of a server, user upload information in a frame layer of a multilayer architecture of the server;
   detecting, by the at least one processor at the frame layer, whether a cyberattack is included in the upload information; and
   only transferring, by the at least one processor, the upload information within the server from the frame layer to a business logic layer of the multilayer architecture of the server for processing at the business logic layer, in response to the cyberattack not being detected.

2. The method of claim 1, wherein the cyberattack is detected according to a sender identifier (ID) included in the upload information.

3. The method of claim 2, wherein the cyberattack is detected in response to the sender ID not being included in a whitelist comprising authorized sender IDs, or in response to the sender ID being included in a blacklist comprising unauthorized sender IDs.

4. The method of claim 2, further comprising, in response to the cyberattack not being detected, updating a whitelist comprising authorized sender IDs, with the sender ID included in the upload information.

5. The method of claim 2, further comprising:
   maintaining, by the at least one processor, a count of a number of times the upload information includes the cyberattack from a same user based on the sender ID; and
   in response to the count being greater than a threshold, restricting, by the at least one processor, access of the same user to the business logic layer and sending a message indicating access is restricted to the same user.

6. The method of claim 1, wherein the detecting comprises:
   extracting, by the at least one processor, a request parameter from the upload information; and
   detecting, by the at least one processor, whether the cyberattack is included in the upload information based on the request parameter.

7. The method of claim 6, wherein the request parameter is an interaction parameter transmitted in an interaction process between a terminal and a server, a login request parameter, or a query request parameter.

8. The method of claim 6, wherein the cyberattack is an Structured Query Language (SQL) injection attack, and
   the cyberattack is detected in response to the request parameter comprising a database special character.

9. The method of claim 6, wherein the cyberattack is a Cross Site Scripting (XSS) injection attack, and
   the cyberattack is detected in response to the request parameter comprising an XSS injection attack special character.

10. The method of claim 1, further comprising:
    extracting, by the at least one processor, sender information from the upload information; and
    only performing the detecting in response to the sender information being included in a security scan whitelist, or in response to the sender information including a request identifier of a vulnerability scan.

11. An apparatus comprising:
    at least one memory configured to store computer program code; and
    at least one processor configured to access the at least one memory and operate according to the computer program code, the computer program code including:
    receiving code configured to cause at least one of the at least one processor to receive user upload information in a frame layer of a multilayer architecture of the apparatus;
    detection code configured to cause at least one of the at least one processor to detect, at the frame layer, whether a cyberattack is included in the upload information; and transmission code configured to cause at least one of the at least one processor to, only transfer the upload information within the apparatus the frame layer to a business logic layer of the multilayer architecture of the apparatus for processing at the business logic layer, in response to the cyberattack not being detected.

12. The apparatus of claim 11, wherein the cyberattack is detected according to a sender identifier (ID) included in the upload information.

13. The apparatus of claim 12, wherein the cyberattack is detected in response to the sender ID not being included in a whitelist comprising authorized sender IDs, or in response to the sender ID being included in a blacklist comprising unauthorized sender IDs.

14. The apparatus of claim 12, wherein the computer program code further comprises updating code configured to cause at least one of the at least one processor to, in response to the cyberattack not being detected, update a whitelist comprising authorized sender IDs, with the sender ID included in the upload information.

15. The apparatus of claim 12, wherein the computer program code further comprises:
 counting code configured to cause at least one of the at least one processor to maintain a count of a number of times the upload information includes the cyberattack from a same user based on the sender ID; and
 restriction code configured to cause at least one of the at least one processor to, in response to the count being greater than a threshold, restrict access of the same user to the business logic layer and send a message indicating access is restricted to the same user.

16. The apparatus of claim 11, wherein the detection code comprises:
 extraction code configured to cause at least one of the at least one processor to extract a request parameter from the upload information, and
 wherein the detection code is configured to cause at least one of the at least one processor to detect whether the cyberattack is included in the upload information based on the request parameter.

17. The apparatus of claim 16, wherein the request parameter is an interaction parameter transmitted in an interaction process between a terminal and a server, a login request parameter, or a query request parameter.

18. The apparatus of claim 16, wherein the cyberattack is an Structured Query Language (SQL) injection attack, and
 wherein the detection code is configured to cause at least one of the at least one processor to detect the cyberattack in response to the request parameter comprising a database special character.

19. The apparatus of claim 16, wherein the cyberattack is a Cross Site Scripting (XSS) injection attack, and
 wherein the detection code is configured to cause at least one of the at least one processor to detect the cyberattack in response to the request parameter comprising an XSS injection attack special character.

20. The apparatus of claim 11, wherein the computer program code further comprises:
 extraction code configured to cause at least one of the at least one processor to extract sender information from the upload information; and
 the detection code is configured to cause at least one of the at least one processor to only perform the detecting in response to the sender information being included in a security scan whitelist, or in response to the sender information including a request identifier of a vulnerability scan.

* * * * *